United States Patent [19]

Hirai et al.

[11] Patent Number: 4,697,047
[45] Date of Patent: Sep. 29, 1987

[54] TRUNK COUPLING UNIT

[75] Inventors: Masato Hirai; Masami Kurata; Ryozo Yoshino, all of Hadano, Japan

[73] Assignees: Hitachi, Ltd, Tokyo; Hitachi Computer Engineering Co., Ltd., Kanagawa, both of Japan

[21] Appl. No.: 891,886

[22] Filed: Aug. 1, 1986

[30] Foreign Application Priority Data

Aug. 21, 1985 [JP] Japan .................................. 60-181807

[51] Int. Cl.$^4$ .............................................. H04B 3/42
[52] U.S. Cl. .................................. 178/2 C; 178/69 B; 178/69 E; 379/417; 375/7
[58] Field of Search .................. 178/69 B, 69 E, 2 C, 178/2 A, 2 R, 2 D, 69 R; 379/109, 417; 370/6; 375/7, 8

[56] References Cited

U.S. PATENT DOCUMENTS 4,293,739 10/1981 Iijima .................................. 379/417

Primary Examiner—Stafford D. Schreyer
Attorney, Agent, or Firm—Antonelli, Terry & Wands

[57] ABSTRACT

A relay circuit comprise first and second relays having respective terminals at which positive cross-talk of a signal of positive polarity is produced when the other terminals to which the positive polarity signal is applied are in the make and break states, respectively, and third and fourth relays having respective terminals at which negative cross-talk of a signal of negative polarity is produced when the other terminals to which the negative polarity signal is applied are in the make and break states, respectively, wherein with regards to the terminals where the cross-talk occurs, the first and fourth relays are connected to each other and said second and third relays are connected to each other, respectively.

3 Claims, 4 Drawing Figures

TRUNK COUPLING UNIT

BACKGROUND OF THE INVENTION

1. Field of the Invention

The present invention in general relates to a trunk coupling unit of a token ring. More particularly, the invention concerns a wiring or interconnection of relays incorporated in the trunk coupling unit.

2. Description of the Prior Art

As to the internal structure of the trunk coupling unit (hereinafter referred to as TCU in abbreviation) designed for interconnecting a token ring transmission path and individual stations, recommendation is made in "IEEE Draft Standard 802.5" (1984).

The TCUs are provided in correspondence to a plurality of individual stations and each serves for switching or controlling the data transfer between a ring-like transmission path and the associated station.

When the associated station is to be connected to the transmission path, the TCU operates to break the transmission path and connect one end of the broken transmission path to the input terminal of the associated station while connecting the other end of the broken transmission path to the output terminal of that station. On the other hand, when the associated station is to be disconnected from the transmission path, both the ends of the broken transmission path are again connected to each other and both the terminals of the station are interconnected. For accomplishing the connections mentioned above, the TCU includes a number of relay circuits.

The TCU of the hitherto known structure suffers a difficulty in that cross-talk takes place through the relay circuits provided internally of the TCU. For having a better understanding of the invention, the reasons for the occurrence of cross-talk in the conventional TCU will be explained below in some detail by referring to FIGS. 3 and 4 of the accompanying drawings.

FIG. 3 is a view for illustrating the occurrence of cross-talk upon connection of a station 1 to a transmission path 3 through an associated TCU 2. Referring to FIG. 3, each of relays 6, 7 and 8 has terminals a, b, and c, wherein the terminal a is selectively connected to either the terminal b or terminal c for connecting the station 1 to the transmission path 3 or disconnecting the former from the latter. A reference numeral 10 denotes a wiring conductor for establishing a connection between the terminals b of the relays 6 and 7, a numeral 11 denotes a wiring conductor for forming connection between the terminals c of the relays 6 and 7, a numeral 12 denotes a wiring conductor for realizing connection between the terminals b of the relays 8 and 9, and a numeral 13 denotes a wiring conductor for the connection between the terminals c of the relays 8 and 9.

In the arrangement shown in FIG. 3, an incoming signal A produced by a transmitter 5 of a preceding station 1 (not shown) is sent through its associated TCU to a receiver 4 of the illustrated station 1 through its relays 6 and 8. On the other hand, a signal B produced by the transmitter 5 of the station 1 is sent through the relays 7 and 9 to the transmission path leading to a TCU of a succeeding station (not shown). In that case, positive cross-talks C(+) of the signal B take place to the terminals c from the terminals b of the relays 6 and 7, respectively, to which the positive polarity of the signal is applied, both cross-talks being added together to be of a magnitude 2C(+) assuming that C(+) also represents the magnitude of each cross-talk. Additionally, negative cross-talks C(−), each having the same magnitude as C(+) and a polarity opposite to that of the latter, take place from the terminals b to the terminals c of the relays 8 and 9, respectively, to which the negative polarity of the signal is applied. Both the negative cross-talks are added together to be 2C(−). In this case, when the signal A becomes quiescent, the cross-talks 2C(+) and 2C(−) of opposite polarities are reproduced by the receiver 4 of the station 1, bringing about erroneous operation.

FIG. 4 is a view for illustrating the occurrence of cross-talk upon disconnection of the station 1 from the transmission path 3 through the associated TCU 1. In FIG. 4, like parts as those shown in FIG. 3 are denoted by like reference symbols.

Referring to FIG. 4, a signal D sent out from the transmitter 5 of the station 1 is fed to the receiver 4 thereof through the relays 7 and 9 and the relays 6 and 8. On the other hand, an incoming signal E derived from the TCU of the preceding stage through the incoming transmission path 3 is sent through the relays 6 and 8 and the relays 7 and 9 to the outgoing transmission path leading to the TCU of the succeeding stage. At that time, positive cross-talks F(+) of the signal E takes place from the terminals c of the relays 6 and 7 to the terminals b thereof, respectively, which are added together to be 2F(+). On the other hand, negative cross-talks F(−), each having the same magnitude as F(+) and having a polarity opposite to that of the latter, occur from the terminals c to the terminals b of the relays 8 and 9, a sum of which is then 2F(−). When the signal D becomes quiescent, both the cross-talks 2F(+) and 2F(−) are reproduced by the receiver 4 of the station 1 to bring about erroneous operation.

SUMMARY OF THE INVENTION

An object of the present invention is to provide a trunk coupling unit of such a structure that the cross-talks taking place in the relay circuits are mutually cancelled.

In view of the above and other objects which will be more apparent as description proceeds, the present invention starts from recognition of the fact that a differential Manchester code recommended as a code for transmission in IEEE Standard 802.5 is insusceptible to the polarity of the code and provides no problem upon exchange of signal lines and provides such that the relays are so connected that some of the signals are inverted in the polarity to thereby allow the cross-talks of different polarities to be cancelled out through addition to each other.

More specifically, there is provided according to an aspect of the present invention a trunk coupling unit which comprises a relay circuit composed of first and second relays of which respective terminals may suffer from cross-talk signals of positive polarity when a signal of a positive polarity is applied to opposite terminals thereof which are in the make state and in the break state, respectively, and third and fourth relays of which respective terminals may suffer from cross-talk signals of negative polarity when a signal of a negative polarity is applied to opposite terminals thereof, which are in the make state and in the break state, respectively, wherein the terminals of the first and fourth relays at which the cross-talk signal may appear are interconnected, while the terminals of the second and third relays at which the cross-talk signal may appear are interconnected.

The above and other objects, features and advantages of the invention will be apparent upon reading the following description taken in conjunction with the accompanying drawings.

DESCRIPTION OF THE PREFERRED EMBODIMENT

In the following, an exemplary embodiment of the present invention will be described.

Figure 1:
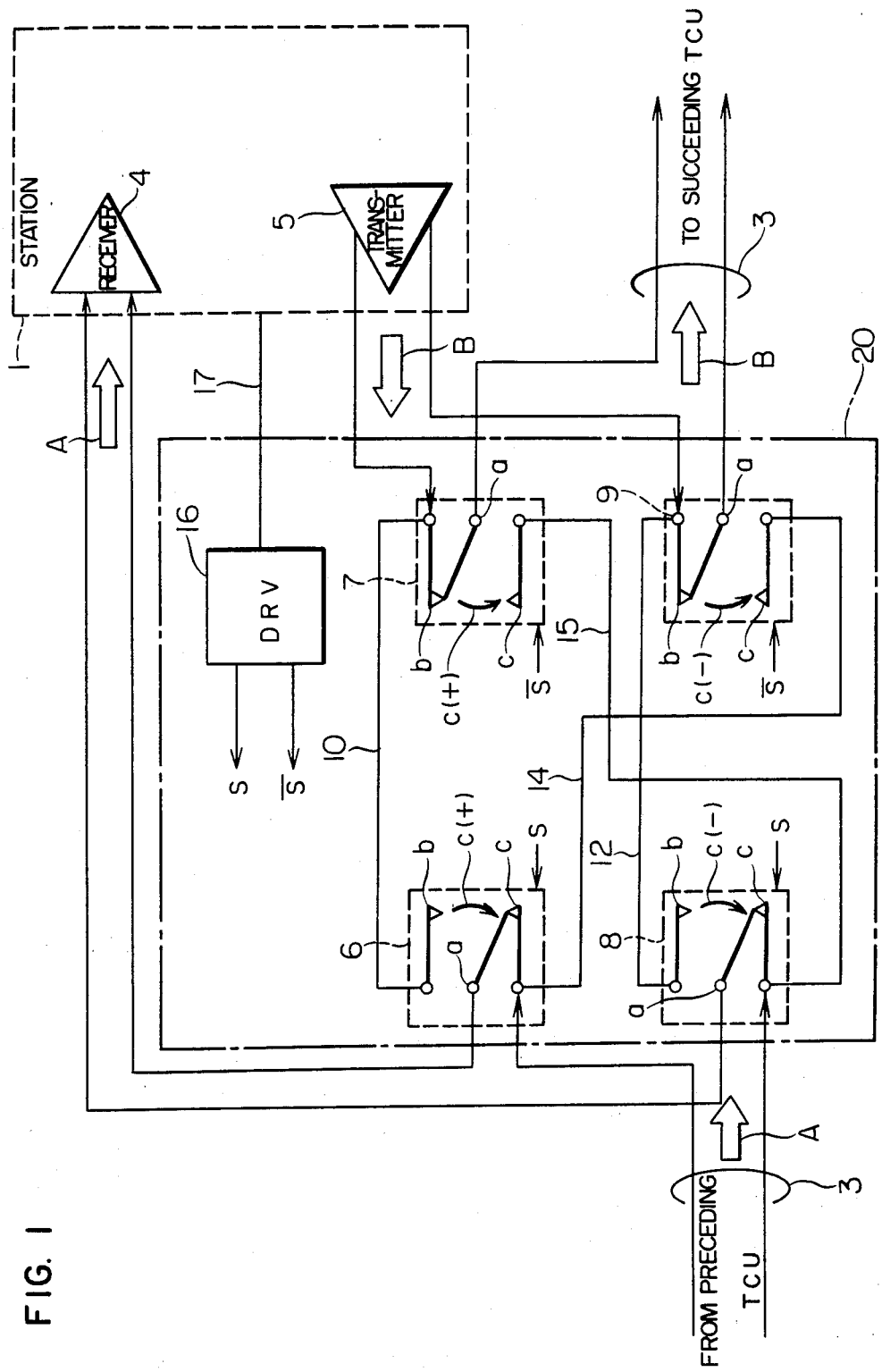
FIG. 1 is a view showing a structure of a trunk coupling unit or TCU according to an embodiment of the present invention in the state in which the station associated with the TCU is connected to a transmission path.
Figure 2:
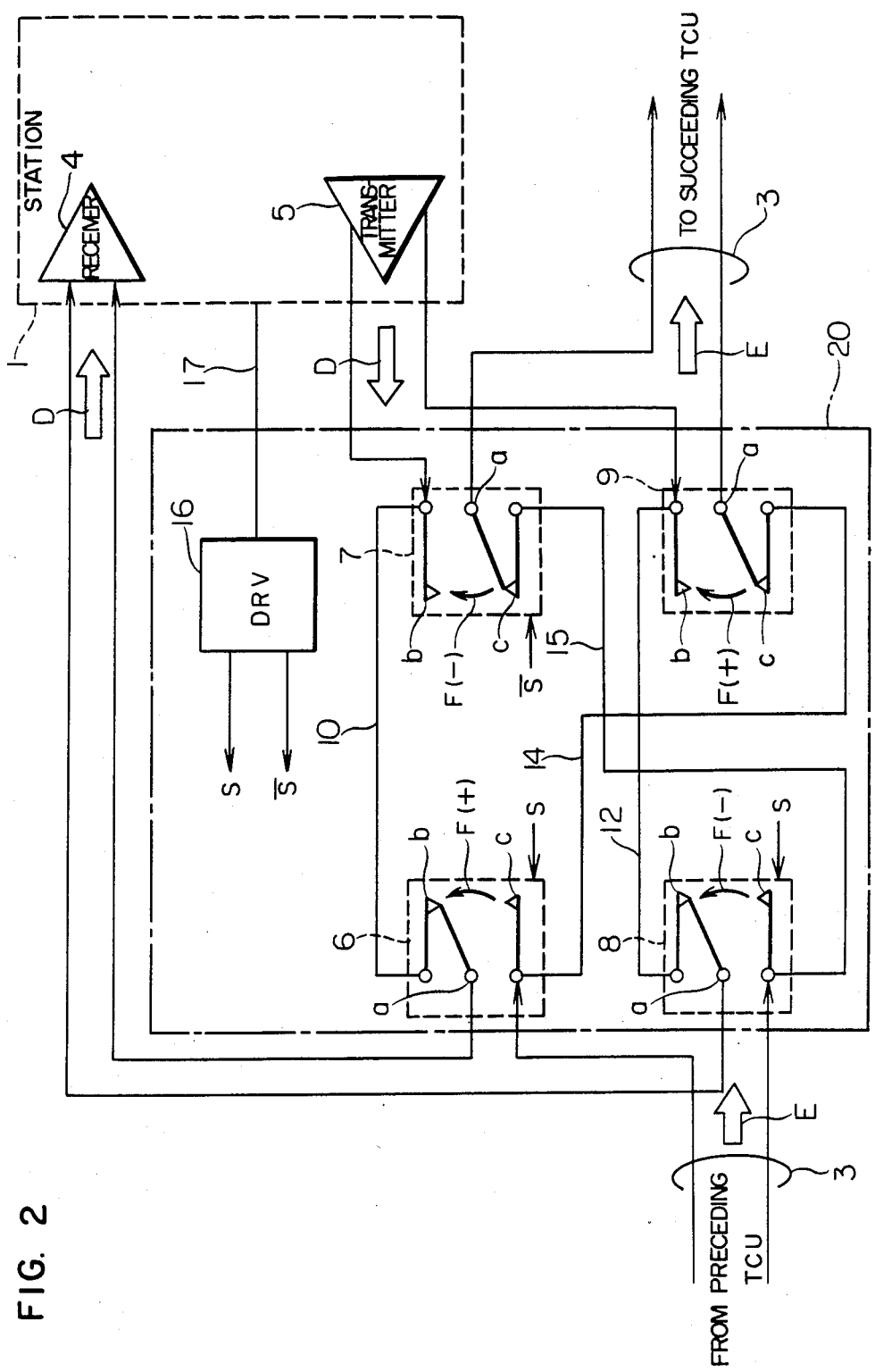
FIG. 2 is a view similar to FIG. 1 but shows the TCU in the state where the associated station is disconnected from the transmission path by the TCU.
Figure 3:
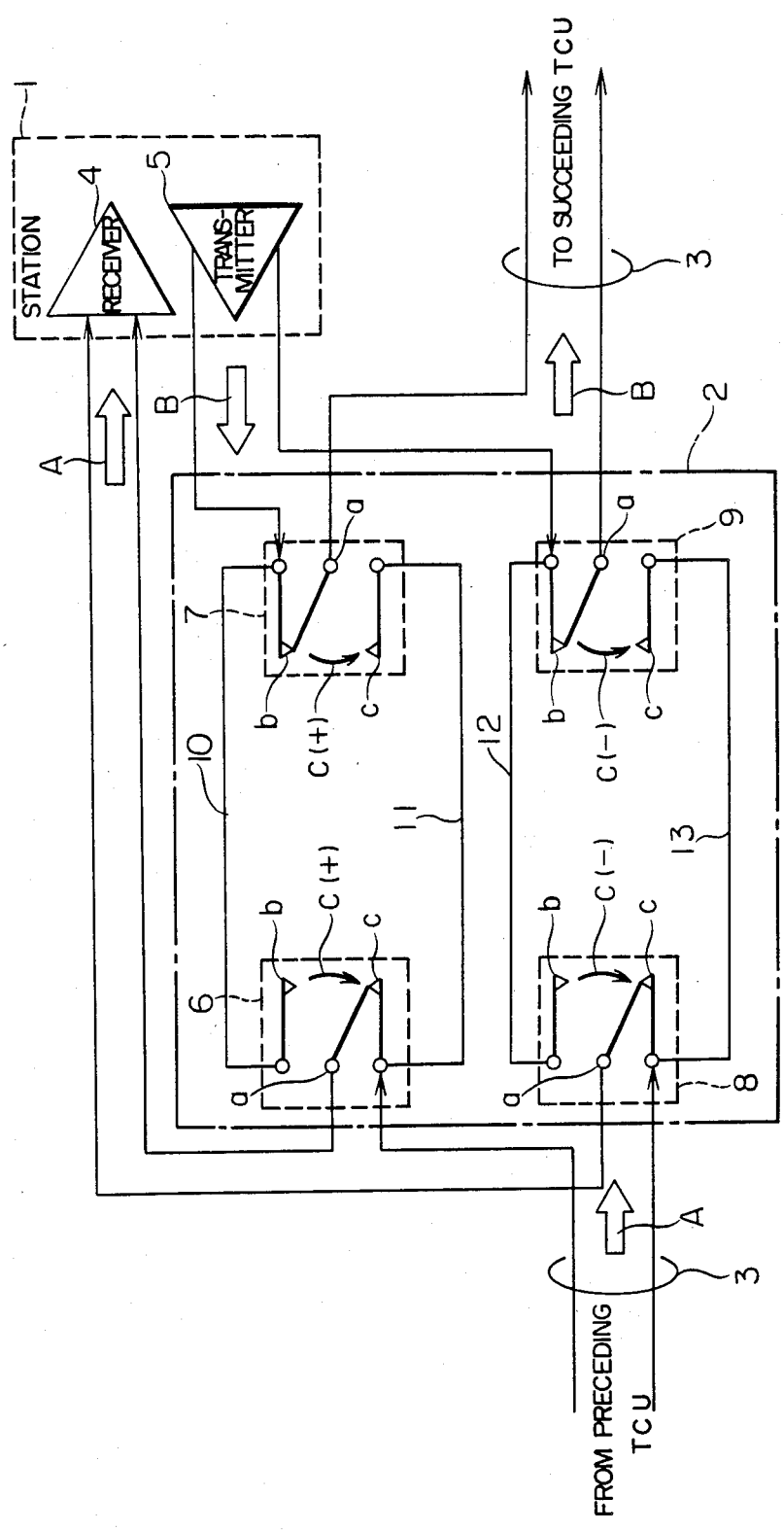
FIG. 3 shows a TCU of hitherto known structure in the state in which a station association with the TCU is connected to a transmission path.
Figure 4:
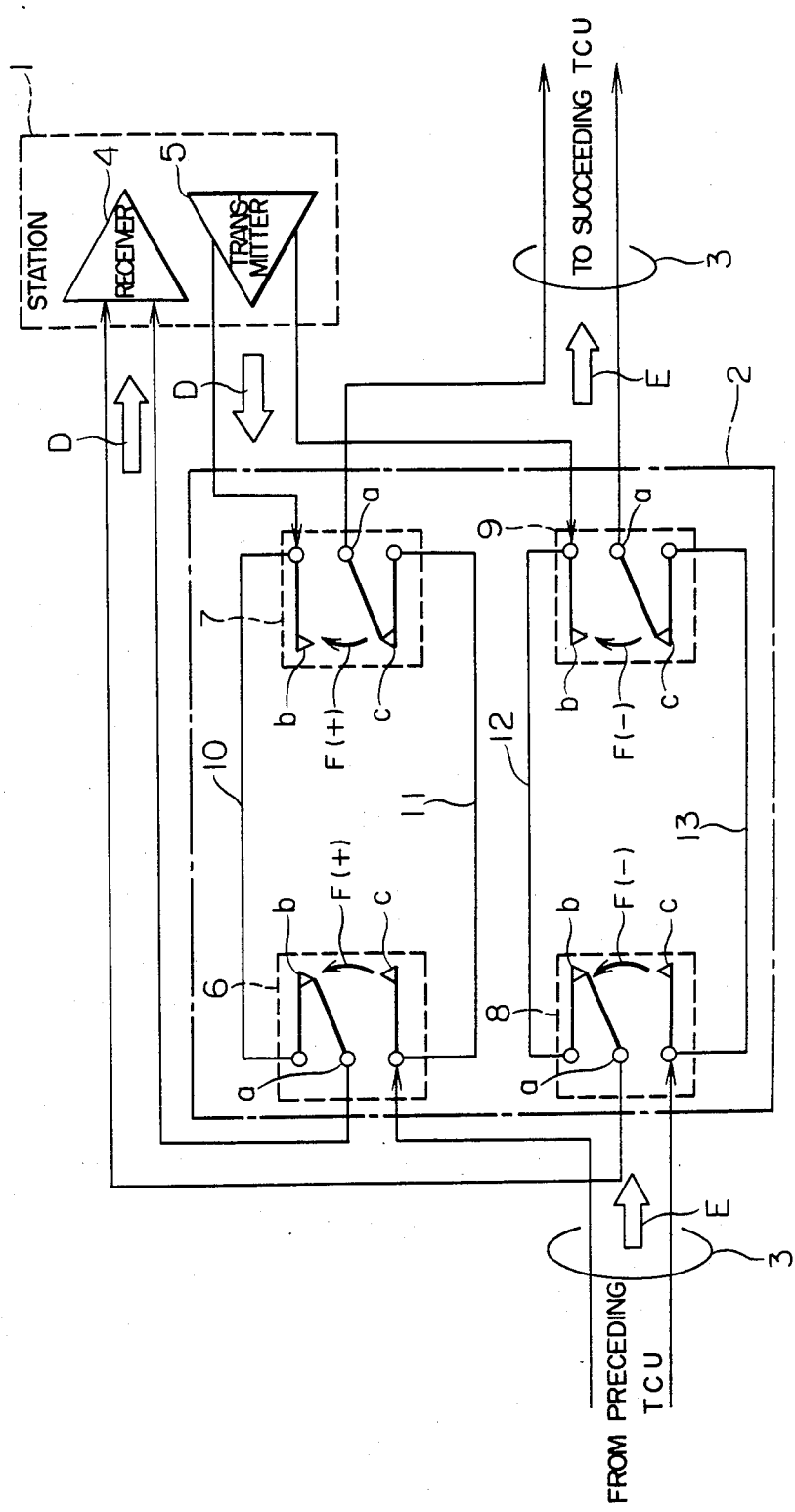
FIG. 4 is a view similar to FIG. 3 but shows the TCU in the state in which the associated station is disconnected from the transmission path.

In the first place, it should be mentioned that a TCU 20 shown in FIGS. 1 and 2 corresponds to the TCU 2 described hereinbefore in conjunction with FIGS. 3 and 4 except for an improvement on the structure of the relay circuit made according to the invention.

In FIGS. 1 and 2, the same circuit components as those shown in FIGS. 3 and 4 are designated by the same reference symbols, a driver circuit 16 produces control signals S and S̄ to relays 6 to 9 in response to a command 17 produced by the associated station 1. When the command 17 indicates that the station 1 is to be connected to the transmission path 3, the signal S is turned on to thereby set the relays 6 and 8 in the break state (i.e. the state in which the contact between the terminals a and c is closed, while the signal S is turned off to set the relays 7 and 9 in the make state (i.e. the state in which the contact between the terminals a and c is opened). On the other hand, when the command 17 indicates that the station 1 is to be disconnected from the transmission path, the signal S is turned off to set the relays 6 and 8 in the make state with the relays 7 and 9 being set in the break state.

The wiring of the relays shown in FIGS. 1 and 2 differs from the one shown in FIGS. 3 and 4 in that the terminals c of the relays 6 and 9 are connected to each other by a wiring conductor 14, while the terminals c of the relays 7 and 8 are connected to each other by a wiring conductor 15.

In the circuit state shown in FIG. 1, an incoming signal A from the TCU of the preceding stage is sent to the receiver 4 of the station 1 through the relays 6 and 8. On the other hand, a signal B generated by the transmitter 5 of the station 1 is sent to the outgoing transmission path leading to the TCU of the succeeding stage through the relays 7 and 9. At that time, positive cross-talk C(+) of the signal B is introduced to the terminals c from the terminal b, respectively, of the relays 6 and 7. Additionally, negative cross-talk C(−) of the signal B is introduced from the terminals b to the terminal c, respectively, of the relays 8 and 9. However, the positive cross-talk C(+) and the negative cross-talk C(−) are mutually cancelled through addition to each other by virtue of the wiring conductors 14 and 15 provided between the relays 6 and 9 and between the relays 7 and 8, respectively. Consequently, cross-talk C of the signal B does not take place in the receiver 4 of the station 1.

In the circuit state shown in FIG. 2, the signal D generated by the transmitter 5 of the station 1 is sent to the receiver 4 of the same station by way of the relays 7 and 9 and the relays 6 and 8. On the other hand, the incoming signal E from the TCU of the preceding station through the transmission path 3 is transferred onto the outgoing transmission path leading to the TCU of the succeeding station through the relays 6 and 8 and the relays 7 and 9. In this case, positive cross-talk F(+) is introduced from the terminals c to the terminals b in the relays 6 and 9, respectively. Additionally, negative cross-talk F(−) is introduced from the terminals c to the terminals b in the relays 7 and 8, respectively. It will however be understood that the positive cross-talk F(+) and the negative cross-talk F(−) are mutually cancelled out by virtue of the wiring conductors 10 and 12 provided between the relays 6 and 7 and between the relays 8 and 9, respectively. Consequently, cross-tank F due to the signal E is prevented from being introduced in the receiver 4 of the station 1.

As will now be appreciated from the foregoing description, cross-talks produced in the relay circuit can be mutually cancelled by the wirings between the relays taught by the invention without need for providing any additional external parts.

We claim:

1. A trunk coupling unit including a plurality of relays each having three terminals, one of which is selectively connectable to either one of the other two terminals, comprising a relay circuit composed of first and second ones of said relays having respective terminals at which positive cross-talk of a signal of positive polarity may be introduced when the other terminals to which said positive polarity signal is applied are in the make and break states, respectively, and third and fourth ones of said relays having respective terminals at which negative cross-talk of a signal of negative polarity may be introduced when the other terminals to which said negative polarity signal is applied are in the make and break states, respectively, wherein with respect to the terminals where said cross-talk may occur, said first and fourth relays are connected to each other and said second and third relays are connected to each other.

2. A trunk coupling unit, comprising:
incoming transmission path having first and second transmission lines;
outgoing transmission path having first and second transmission lines;
a station equipped with receiver means having first and second inputs and transmitter means having first and second outputs;
four relays each having a first terminal and a pair of second terminals selectably connectable to said first terminal, and including;
a first relay having the first terminal connected to the one input of said receiver means, and one of said second terminals connected to one of said incoming transmission lines;
a second relay having the first terminal connected to one of said outgoing transmission lines, one of said second terminals connected to the first output of said transmitter means and to the one of said second terminals of said first relay, and the other terminal connected to said second incoming transmission line;

a third relay having the first terminal connected to the second input of said receiver means and one of the second terminals connected to the second incoming transmission line;

a fourth relay having the one terminal connected to the second outgoing transmission line, one of the second terminals connected to the second output of said transmitter means and connected to the other second terminal of said third relay, and the other second terminal connected to said first incoming transmission line; and driver means for controlling said first to fourth relays for establishing connection between said station and said incoming and outgoing transmission paths in dependence on commands issued by said station.

3. A relay circuit including a plurality of relays for connecting a first terminal and either one of second terminals, wherein one of said relays is connected to the other of said relays in such a manner in which when one of said second terminal of said one relay is connected to one of said second terminal of said other relay, signal supplied to the other of said second terminals of said one relay is complementary to the signal supplied to the other second terminal of said other relay.

* * * * *